US011913445B2

(12) United States Patent
Merheim et al.

(10) Patent No.: US 11,913,445 B2
(45) Date of Patent: Feb. 27, 2024

(54) METHOD FOR DESIGNING, GAUGING AND OPTIMIZING A MULTIPLE COMPRESSOR SYSTEM WITH RESPECT TO ENERGY EFFICIENCY

(71) Applicant: Enersize OY

(72) Inventors: Christian Merheim, Helsingborg (SE); Anders Sjögren, Lund (SE)

(73) Assignee: ENERSIZE OY, Helsinki (FI)

( * ) Notice: Subject to any disclaimer, the term of this patent is extended or adjusted under 35 U.S.C. 154(b) by 785 days.

(21) Appl. No.: 16/982,533

(22) PCT Filed: Mar. 19, 2019

(86) PCT No.: PCT/EP2019/056803
§ 371 (c)(1),
(2) Date: Sep. 18, 2020

(87) PCT Pub. No.: WO2019/179997
PCT Pub. Date: Sep. 26, 2019

(65) Prior Publication Data
US 2021/0003127 A1   Jan. 7, 2021

(30) Foreign Application Priority Data

Mar. 20, 2018   (CN) .......................... 201810230815.7
Mar. 20, 2018   (SE) .................................... 1850312-8

(51) Int. Cl.
*F04B 49/06*   (2006.01)
*G05B 17/02*   (2006.01)
(Continued)

(52) U.S. Cl.
CPC .............. *F04B 49/06* (2013.01); *F04B 41/06* (2013.01); *F04B 51/00* (2013.01); *G05B 17/02* (2013.01)

(58) Field of Classification Search
CPC .......... F04B 49/06; F04B 41/06; F04B 51/00; F04B 41/00; F04B 49/007; F04B 49/065; G05B 17/02; F04D 25/16; F04D 27/0269
(Continued)

(56) References Cited

U.S. PATENT DOCUMENTS 5,742,500 A    4/1998  Irvin
6,394,120 B1   5/2002  Wichert
(Continued)

FOREIGN PATENT DOCUMENTS

CN   200680011518 A   4/2008
CN   201610567438 A   12/2016

OTHER PUBLICATIONS

Staroselsky N et al: "Parallel Centrifugal Gas Compressors Can Be Controlled More Effectively ", Oil and Gas Journal, Pennwell, Houston, TX, US, vol. 84, No. 44, Nov. 3, 1986 (Nov. 3, 1986), pp. 78-82, XP002023664, ISSN: 0030-1388.
(Continued)

*Primary Examiner* — Michael J Brown
(74) *Attorney, Agent, or Firm* — MOSER TABOADA

(57) ABSTRACT

The present invention describes a method for gauging energy used for producing a unit of mass or volume of compressed gas (Specific Energy Consumption) in relation to a common output flow in a multiple compressor system, said method comprising: —from a first compressor, constructing an ideal specific energy consumption curve in the first compressor as a function of the output flow of the first compressor; and —from a first compressor and a second compressor, constructing a combined ideal specific energy consumption specific energy consumption curve in the first compressor and the second compressor as a function of the combined output flow of the first compressor and the second compressor, wherein the method involves constructing one
(Continued)

Figure 1:
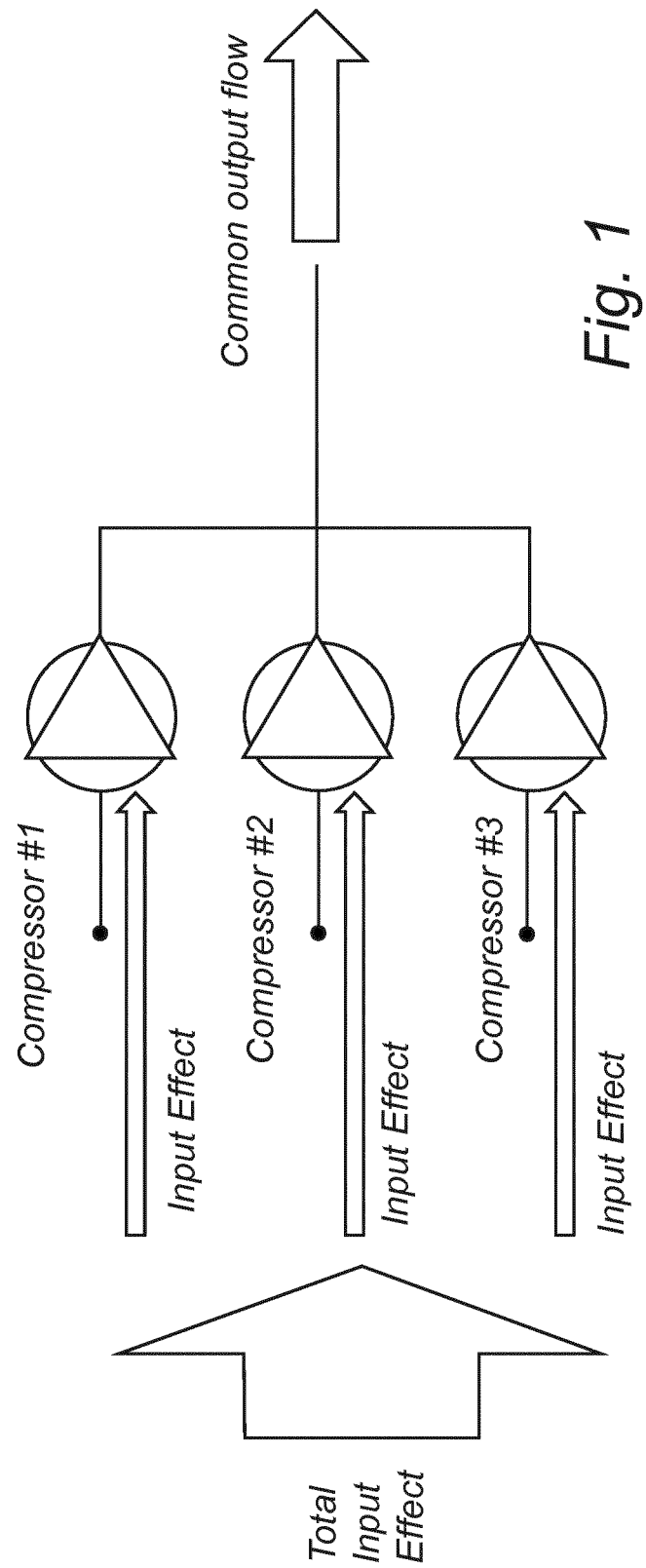

or several ideal specific energy consumption curve(s) for multiple combined compressors, in any combination(s), and wherein the method involves creating a theoretical operation model for the multiple compressor system.

18 Claims, 11 Drawing Sheets

(51) Int. Cl.
*F04B 41/06* (2006.01)
*F04B 51/00* (2006.01)
*F04D 25/16* (2006.01)

(58) Field of Classification Search
USPC .......................................................... 700/282
See application file for complete search history.

(56) References Cited

U.S. PATENT DOCUMENTS

| | | | |
|---|---|---|---|
| 7,155,367 | B1 | 12/2006 | Shapiro et al. |
| 9,181,953 | B2 * | 11/2015 | Steger ................ F04D 15/0066 |
| 2006/0257265 | A1 | 11/2006 | Georg et al. |
| 2008/0131258 | A1 | 6/2008 | Liepold et al. |
| 2009/0204234 | A1 * | 8/2009 | Sustaeta ............. G05B 13/0265 |
| | | | 700/29 |
| 2010/0178154 | A1 | 7/2010 | Dirks et al. |
| 2011/0081255 | A1 | 4/2011 | Perry et al. |
| 2013/0287592 | A1 | 10/2013 | Kenichi et al. |
| 2014/0034009 | A1 | 2/2014 | Brinkmann et al. |

OTHER PUBLICATIONS

Murphy et al.: "Simulating Energy Efficient Control of Multiple-Compressor Compressed Air Systems", University of Dayton eCommons 2015—ecommons.udayton.edu.

Mousavi et al. : "Energy Efficiency of Compressed Air Systems", published by Elsevier B.V. https://doi.org/10.1016/j.procir.2014.06.026.

* cited by examiner

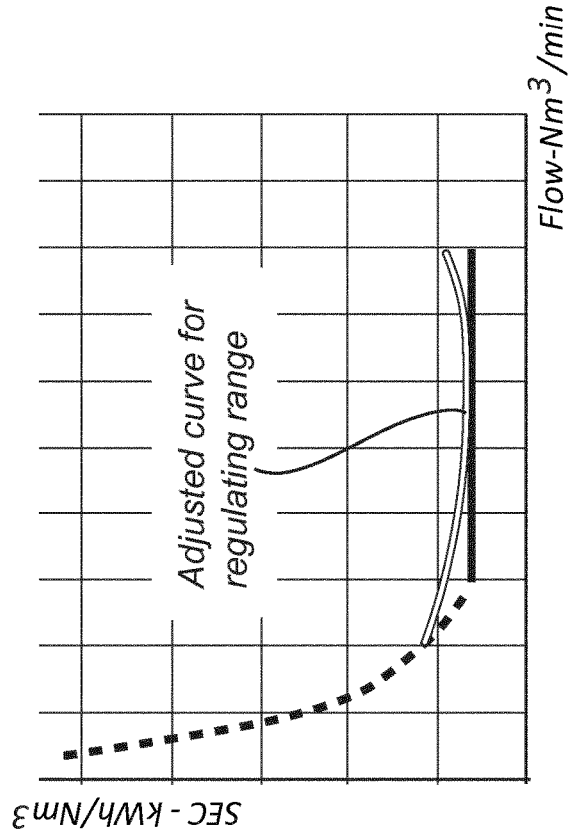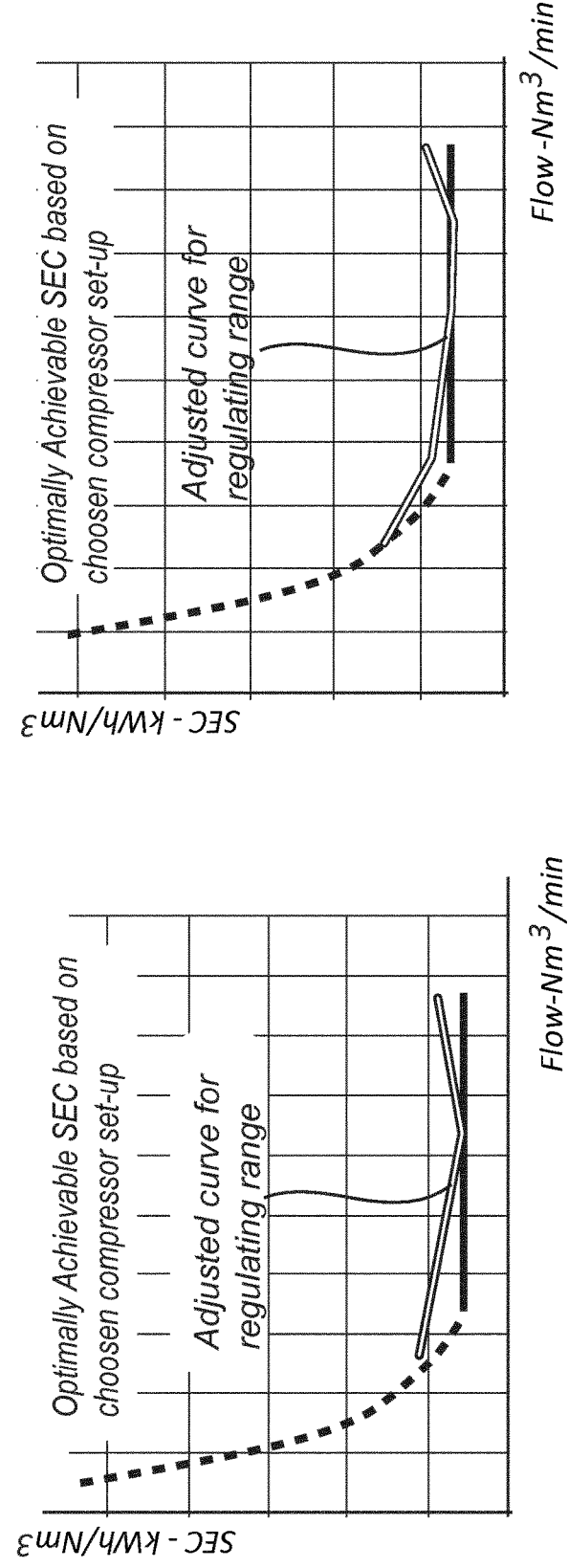
Fig. 3

METHOD FOR DESIGNING, GAUGING AND OPTIMIZING A MULTIPLE COMPRESSOR SYSTEM WITH RESPECT TO ENERGY EFFICIENCY

FIELD OF THE INVENTION

The present invention relates to a method for gauging energy used for producing a unit of mass or volume of compressed gas (Specific Energy Consumption) in relation to a common output flow in a multiple compressor system.

TECHNICAL BACKGROUND

Multiple compressor systems are used in several industrial applications. Use of such and methods for controlling them are disclosed in several documents. To give one first example, in U.S. Pat. No. 5,108,263 there is disclosed a method of optimizing the operation of two or more compressors in parallel or in series. The method is directed to that the operating points of each pair of compressors are mutually and incrementally displaced without affecting the total operation parameters. The effect of the displacement on the total constraint is monitored and when the variation is occurring in the direction of optimization, it is continued in the same direction. Otherwise, the pressure that the operating points are displaced in is reversed. The procedure gradually shifts the compressors over to the optimal combination of operating points.

Secondly, U.S. Pat. No. 7,676,283 discloses a method for controlling a compressor plant having at least two compressor units, which method involves using an optimization calculation to calculate a new switching configuration from a current switching configuration of the compressor units.

Moreover, in EP0769624 there is disclosed a method and apparatus for load balancing among multiple compressors. The approach implies that the surge parameters, S, change in the same direction with rotational speed during the balancing process. The load balancing control involves equalizing the pressure ratio, rotational speed, or power when the compressors are operating far from surge. Then, as surge is approached, all compressors are controlled, such that they arrive at their surge control lines simultaneously.

Furthermore, there are also several other methods of controlling multiple compressor system disclosed in other patent documents, e.g. in U.S. Pat. No. 6,394,120.

Moreover, in the article "Parallel centrifugal gas compressors can be controlled more effectively"; Oil and gas journal; 1986, vol 84(44), pages 78-82 (Staroselsky N, Ladin L) there is disclosed both single compressor operation and multi-compressor operation. In the section relating to multi-compressor operation there is disclosed a case analysis of energy performance of 2 compressors with different strategies for unload and load of compressors simultaneously, unload and load of compressors in sequence as well as combining the simultaneous and sequential unloading.

The present invention is directed to creating an operation model for a multiple compressor system. The operation model may be used for gauging energy used for producing a unit of mass or volume of compressed gas (Specific Energy Consumption) in relation to a common output flow in the multiple compressor system, and may thus also be used when designing a new system, when measuring an existing system and/or as a software module connected to a control system for operating a multiple compressor system.

Analyzing existing compressed air systems for optimization or future changes as well as designing systems from scratch poses many difficulties. A compressed air system is made up of many different parts installed by many different vendors with many mixed brands even for parts of the same type, compressors, etc. Detailed information of design or performance curves and similar is rarely provided by compressor manufacturers which make these tasks even harder.

Compressors are designed for different optimal pressures and it is not uncommon that a single multi compressor system consist of compressors of different type, regulation methods, manufacturer and design pressure.

SUMMARY OF THE INVENTION

The stated purpose above is achieved by a method for gauging energy used for producing a unit of mass or volume of compressed gas (Specific Energy Consumption) in relation to a common output flow in a multiple compressor system, said method comprising:
  from a first compressor, constructing an ideal specific energy consumption curve in the first compressor as a function of the output flow of the first compressor; and
  from a first compressor and a second compressor, constructing a combined ideal specific energy consumption curve in the first compressor and the second compressor as a function of the combined output flow of the first compressor and the second compressor, wherein the method involves constructing one or several ideal specific energy consumption curve(s) for multiple combined compressors, in any combination(s), and wherein the method involves creating a theoretical operation model for the multiple compressor system.

The method as disclosed above is not hinted in any of the prior art documents shown above. For instance, in contrary to the article "Parallel centrifugal gas compressors can be controlled more effectively"; Oil and gas journal; 1986, vol 84(44), pages 78-82 (Staroselsky N, Ladin L), the method according to the present invention is directed to constructing the ideal specific energy consumption (SEC) curve(s) for any combinations of the compressors in question for the whole range of flow values in demand. Furthermore, the present invention involves creating a theoretical operation model for the multiple compressor system, which is not performed in any of the prior art documents mentioned above. Moreover, the method according to one specific embodiment of the present invention is directed to choosing the most optimal compressor combination(s) and their operational conditions, such as individual consumed power and generated flow to guarantee the best performance of a compressor system dynamically. This is yet another clear difference in relation to known methods.

Furthermore, the method may comprise constructing/calculating the ideal specific energy consumption curve(s) for one or more fixed system reference pressure(s) substantially simplifying calculations and visualization as the model becomes independent of system pressure changes. Also, other less affecting variables, such as intake air temperature or pressure, may be taken into account.

As may be understood from above, a multiple compressor system according to the present invention comprises at least two compressors, but may of course comprise several compressors. In this context it should also be mentioned that the expressions "first" and "second", and of course "third" and so on, if used, should not be seen as a specific order in the multiple compressor system, but instead an imaginary number to separate the different compressors in the multiple compressor system. As such, e.g. the third compressor of a certain multiple compressor system may be the smallest compressor in the system. So, the numbering is just an imaginary number and does not imply a certain order in the system with reference to position, size or something else. Fact is that the present invention may be used to understand the best order of operation for a certain multiple compressor system, implying that it gives insight of which compressor should be the first to set into production, which should be the second one used in combination with the first, or in systems comprising even further ones any type of combination(s), such as a second plus a fourth or a second plus a third plus a fourth, and so on. Moreover, the type of compressors involved may be of any type, in fact also certain pumps, such as pumps or systems with over outlet valves or over pressure valves and that are demand controlled, however the method according to the present invention is of special interest for gas compressors, e.g. air compressors.

The proposed method/invention makes it possible to simulate and optimize multi compressor systems with very high accuracy based on just a few parameters and also independent of pressure changes present in the system. The manufacturer often states a single efficiency performance number for their compressors as the specific energy consumption at the compressors optimal design point (ideal flow) at a certain fixed pressure. Together with the motor type plate nomination of motor size (typically in kW or hp) and knowledge of what type of regulating method that is used for a specific compressor, these parameters are enough to create specific energy performance profiles for compressors with very simple calculations as both optimal design point, regulating flow range, ideal Specific Energy Consumption and maximum possible flow at a certain pressure can be derived from the base data available.

Below, the expression "energy used for producing a unit of mass or volume of compressed gas" or "Specific Energy Consumption" is sometimes called SEC in the compressor industry, which, just to give an example, may be expressed in the unit $kWh/Nm^3$ or kWh/kg, or may be expressed as volume per energy unit, e.g. $Nm^3/kWh$ (where $Nm^3$ means "normal cubic meter", i.e. the volume of gas produced at normal atmospheric pressure and standard temperature, usually of 0 or 15° C.). Another commonly used standardized expression used as an alternative to specific energy consumption is specific power consumption (SPC or SP), which often is measured in the unit $kW/(Nm^3/min)$, and this and other equivalents may also be used according to the present invention. In this context it may be said that the expression specific energy consumption may refer to both energy/produced mass or volume unit and produced mass or volume unit/used energy unit.

Specific Energy Consumption varies with pressure but it is well known, throughout literature in the field of thermodynamics, that effects of pressure changes on compressor efficiency can be estimated. One common method is by using a non-reversible polytrophic compression process to estimate the effect of a pressure changes on the compressors workload and thus its specific energy consumption. The proposed method according to the present invention decouples the pressure effects from the operating model giving an advantage over other methods as the reference pressure for the model can be freely selected, changed or adjusted while the effects of the pressure changes can still be taken into account.

The expression "ideal specific energy consumption" should be seen as the specific energy consumption obtained in accordance with the model used according to the present invention. With reference to an ideal specific energy consumption curve, the following may be explained: Every compressor or compressor combination and operational mode thereof has an ideal specific energy consumption curve, at a certain pressure level, i.e. for each total flow amount the ideal sec curve show the lowest attainable specific energy consumption at that pressure level. The ideal specific energy consumption curves may be adapted to realistic compressor systems by taking into account internal imperfections in compressor installation or control, or external variations in pressures or intake or outlet temperatures. A single compressor or combination of compressors can therefore have different ideal specific energy consumption curves depending on internal and external factors. Such ideal specific energy consumption curves can therefore also include simulated errors or faults. For example an operation mode from which an ideal specific energy consumption curve is generated could be including a faulty blow-off valve on one compressor leaking equivalent to being 10% open all the time.

Output flow is driven by the demand and leaks. Specific energy consumption, however, is possible to control based on that specific output flow, implying that even if the output flow is fixed it is possible to change the specific energy consumption by changing compressor and system operating parameters, configurations or combinations. The ideal specific energy consumption curve may also be seen as an optimal performance profile given a decided output flow range at a certain pressure. In the method according to the present invention, the ideal specific energy consumption curve is calculated for different combinations of compressors and/or operation modes in the multiple compressor system. The ideal specific energy consumption curve for one single compressor is first calculated according to the present invention, for a specific pressure. Then, the combined ideal specific energy consumption curve for another combination with the same first compressor and also another compressor in the multiple compressor system is calculated for the same specific pressure. It should be noted that, the first as well as the second compressor may be anyone in a system comprising several compressors. Moreover, the combined ideal specific energy consumption curve may also involve one or more compressor(s) which is(are) operating in another mode, for example in unload, i.e. pressurized standby with running motor but with no flow delivery (recirculation, closed air intake, etc. depending on compressor design). Furthermore, the method may of course also comprise constructing or calculating multiple combined ideal specific energy consumption curves of different combinations, such as for a first, a second and a third compressor together, or only a second and a third compressor together, or even more combined compressors, e.g. of which one or more are in another operating mode such as unloaded (standby) position.

Furthermore, the method may of course also comprise constructing the ideal specific energy consumption curves at different reference pressures.

The method according to the present invention provides how the different ideal specific energy consumption curves are dependent on the compressor's output flow, i.e. the operation model that describes how the system operates. As such, by constructing the ideal specific energy consumption curve in the first compressor as a function of the output flow of the first compressor the method provides to set how the ideal specific energy consumption curve in the first compressor is dependent on the output flow of the first compressor. Likewise, by constructing any other combination of compressors and or operating mode to provide the ideal specific energy consumption curve of that combination and mode. The method according to the present invention provides to set how the ideal specific energy consumption curve in that compressor combination and mode is dependent on the output flow of said compressor combination.

SPECIFIC EMBODIMENTS OF THE INVENTION

Below, specific embodiments of the present invention are provided.

According to one specific embodiment, the method involves using one or more fixed system reference pressure(s) for constructing the ideal specific energy consumption curve(s). According to the present invention, the method involves constructing one or several ideal specific energy consumption curve(s) for multiple combined compressors, in any combination(s). Again, the method according to the present invention may be employed on any compressor combinations, such as a first plus a third compressor, a second plus a third compressor or a first, a second and a third compressor together, and so on.

According to yet another embodiment, the method involves constructing one or more ideal specific energy consumption curve(s) for multiple combined compressors, in any combination(s), and wherein at least one combination is based on combining adjustable flow ranges of individual compressors. Moreover, according to yet another specific embodiment of the present invention, the theoretical operation model is based on combing non-adjustable flow ranges and adjustable flow ranges for individual compressors separately to form one single virtual compressor. To combine non-regulating (non-adjustable) flow ranges and regulating (adjustable) flow ranges separately to stack and add the non-regulating flow ranges on top of each other first and then stack and add the regulating flow ranges on top of each other secondly is further shown in FIG. 7. It should also be mentioned that the present invention may be employed on multiple compressor systems with one or several compressors which are not possible to regulate, and where the different compressor sizes (flow capacity), and specific energy consumption curves are the parameters used to improve the mode of operation for a multiple compressor system. Moreover, it should also be mentioned that the ideal specific energy consumption curve(s) within the regulating flow range and the size of the regulating flow range is set according to models of a generalized compressor type, measurements on real compressors or manufacturer data.

The model according to the present invention may not only be affected in relation on non-adjustable and adjustable flow ranges of the different compressors, but may also be pressure adjusted to different reference pressures. Furthermore, according to one specific embodiment, the specific energy consumption curve(s) is calculated with specific energy consumption set as a constant within the compressor(s) regulating flow range and where ideal specific energy consumption curve(s) is calculated from a constant power use for the compressor(s) non-regulating flow range. This alternative is further depicted and explained in FIG. 2 of the drawings. Moreover, according to yet another embodiment, the ideal specific energy consumption curve(s) is adjusted for changes in efficiency within the regulating flow range. The adjustment in efficiency may be done with a standardized profile based on the position in the regulating flow range and based on the specific compressor type and regulating range.

The regulating flow range of compressors as well as the profile of the efficiency over the regulating range differ between compressor types. The non-regulating flow range is typically defined by the fact that the compressor or compressed gas system activates one or more valves to relieve the system from the excess flow generated. These valves are usually named relief-valve, blow-off, blow-down, BOV, waste-gate valves or similar. These valves may blow out the excess generated gas in the free air or recycle it to the low-pressure side of the compressor or internally to any middle stages. The use of relief-valves induces a huge loss of compressor and/or system inefficiency as already compressed gas is wasted with the loss off all energy stored as a result of the depressurization.

Common regulating methods used for compressor regulation is different types of inlet throttling (used for all types of compressors but most efficient in dynamic compressors such as axial or radial turbo compressors/centrifugal compressors). These different types go under different names, such as butterfly-valve, IGV or DVG.

Another common method with a very good efficiency profile that is widely used for all compressor types is regulation through speed control of the compressors motor. These are often named VSD, frequency drive or inverter drives.

Each combination of compressor type (screw, piston, turbo scroll etc. etc.) and control method creates its own characteristic specific energy consumption profile regarding regulating efficiency over the regulating flow range as well as the size of the usable regulating range. The regulating flow range also varies depending on pressure and compressor design.

The efficiency is also affected by the characteristics of the electric motors used in most compressors (also combustion engines or steam turbines are used). Most electric motors used in compressors have their optimal efficiency at app. 75-80% of the nominal output power and some motors may also be operated above their nominal output.

Moreover, with most compressor types the total error with the simplest model according to the present invention is below about 10%, which implies that already this level gives information to enable optimization, especially in the cases of compressors without regulation. With a further improved model with linear adjustment, then the error is about below 2-3%. Moreover, mismatched compressors may provide an increase of more than 100% in specific energy consumption. Systems operating about 30-40% above optimal specific energy consumption are common.

Furthermore, according to yet another specific embodiment of the present invention, the ideal specific energy consumption curve(s) for every compressor is adjusted towards one or more constant pressure(s) in the multiple compressor system. All specific energy consumption calculations are adjusted towards a reference pressure which is constant. This reference pressure may of course be adjusted. Moreover, according to yet another specific embodiment of the present invention, the data of ideal specific energy consumption vs common output flow is structured and plotted using the same reference pressure or where the plotting is executed with one additional dimension featuring a variable reference pressure.

The ideal specific energy consumption curve(s) may be calculated based on design curves employing measured or theoretical performance curves of the individual compressors in the multiple compressor system. Therefore, according to one specific embodiment of the present invention, the ideal specific energy consumption curve(s) is calculated employing design or performance curves of the individual compressors. The design curves of the individual compressors are based on the best operation mode ("sweet spot") for the individual compressors and/or by information from the manufacturer, or using generalized information well known in the field of compressors. Based on the above, the method according to one embodiment of the present invention may have the following steps. Firstly, the ideal specific energy consumption curve(s) is calculated for each compressor and combinations for a chosen reference pressure. The sizes of the regulation flow ranges are also determined, which are given in share (percentage) of the flow capacity and are based on the type of compressor. The model according to the present invention may then be employed so that ideal specific energy consumption is constant in the adjustable flow ranges and the power consumption is constant in the non-adjustable flow ranges. The power consumption can be set as a constant in the non-regulating flow range as further regulating capacity to lower the flow is absent and the requirement to uphold a fixed pressure will force the system to discharge any excess flow that is being produced. Finally, the model is adjusted in the adjustable flow ranges based on changes in efficiency within the adjustable flow ranges. This final adjustment may be performed in different ways, such as linear, non-linear, as a curve based on some points, etc. (see FIG. 3).

Furthermore, the operation model according to the present invention may also be adjusted based on time dependency so that time dynamic data is used. According to one specific embodiment of the present invention, the method and thus operation model involves compensation of the usable flow range for each compressor combination and operating mode based on the time dependency of each of the compressors when going from off mode to on mode, from unload (standby) to load (active or delivery mode), which are different operating modes, and/or the rate of change in flow rates measured or estimated in the multiple compressor system.

The present invention is based on modeling and analyzing combinations of compressors and their efficiency over the flow range available for that combination and/or operating mode. As the flow demand varies the required flow may increase beyond of what a certain combination can deliver. The compressor combination must then be changed into another combination which has the possibility to deliver the required flow. Such a transition from one combination to another with a higher capacity require additional compressors to be started. It may also involve starting several new compressors as well as shutting off compressors currently in operation.

When starting a compressor there is a time delay before the compressor has gained enough speed and pressure so that it can be connected to the rest of the system. To give the compressor(s) enough time to reach a production state it is not possible to fully utilize the flow range of a certain combination of compressors to its maximum. The size of the limitation, e.g. non-usable flow range for a combination is determined by a combination of the speed of the changes in system flow demand as well as the time it takes to bring a compressor on-line.

Over-compensation of the needed switching point from one combination to another is a very common cause for decreased energy efficiency in a multi-compressor system and the present invention provides a new and precise tool to optimize this from an energy efficiency perspective.

The most common reason for discrepancies between measured curves and desired curves is inadequate regulation synchronization between different compressors or compressor groups causing compressors without regulating capabilities to go into blow-off or stand-by mode while there is still unused regulating capacity available from the systems compressors with regulating capability. Another related fault in existing installations is not operating the regulating compressors at all or not using the regulating compressors within their regulating range in certain used combinations, which renders the system without regulating capabilities in that flow range. Such situations is easily identified by using the plotting of individual compressor energy use vs. total flow where such spare regulating capacity easily can be seen based on visualizing selected measurement data that has been associated to a single simulated operating mode.

Figure 6:
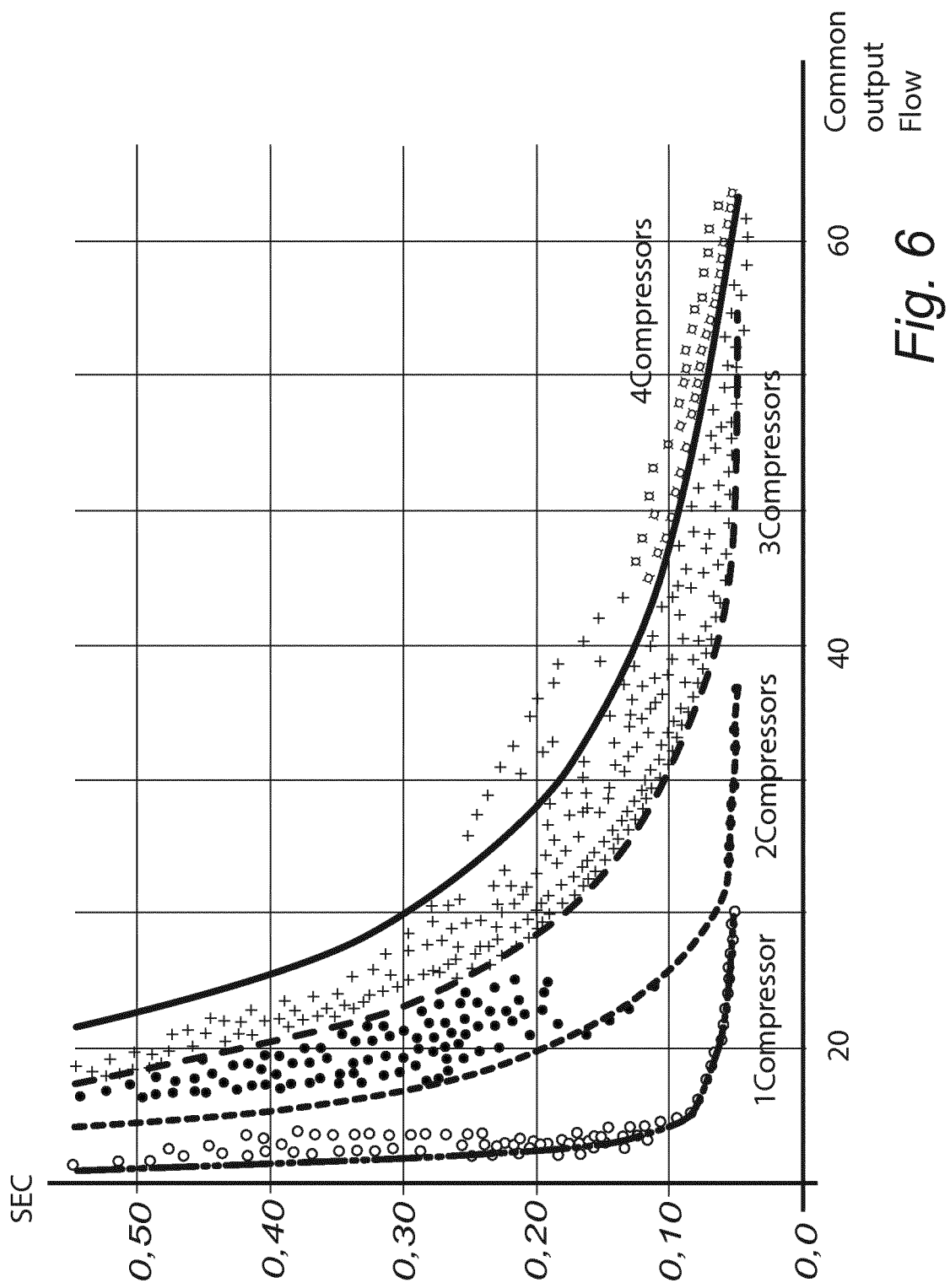

Moreover, the model according to the present invention is also suitable to be compared to real measurement data (see FIG. 6). According to one specific embodiment of the present invention, measured specific energy consumption, i.e. real data, from the multiple compressor system is compared with the data of the calculated ideal specific energy consumption curve(s) for the same multiple compressor system. If measured specific energy consumption is not correlating with the correct ideal specific energy consumption curve(s) then this shows that the operation mode is not optimal in that specific operation point. The next step is then to find and analyze the reason for this. In this context it should also be mentioned that the measured specific energy consumption may or may not be adjusted to the used reference pressure for the calculation.

It should also be said that when plotting real measurement data, this data may be plotted without taking into account the actual number of compressors comprised in the multiple compressor system. However, when energy measurement data from individual compressors are plotted then this comparison with the in theory corresponding ideal specific energy consumption curve can give valuable additional system information. Regardless, it should be understood that the method according to the present invention may involve only plotting total energy consumption and total output flow to receive a relevant measurement. It may be of interest to be able to disaggregate the compressors when measuring the same, i.e. measure compressors individually without measuring all parameters individually. To measure the individual flow from a compressor is quite difficult, however power is considerably easier. With the present invention, by only measuring total power and output flow as well as activity (mode of individual compressors) it is possible to measure and evaluate the operation modes of a multiple compressor system. In addition to activity, other measuring methods are possible according to the present invention, such as e.g. voltage/current, on/off signals, variable control signals etc.

It should be mentioned that the power of a compressor is commonly measured indirectly in a sensor by measuring current and knowing or measuring voltage. The power is the product of voltage and current and may be output from the sensor as an analog signal. However, it is common that power is integrated to energy and that the sensor outputs pulses when a certain amount of energy has been consumed. In this manner, the power can be estimated.

It may also be mentioned that the standard model according to the present invention is pressure dependent. In many compressor systems, it is desirable to avoid varying pressure, and then the reference pressure ("working pressure") is used for the entire system to analyze specific energy consumption and flow. As mentioned above, however, this reference pressure may be varied when testing in simulations. Varying pressure might be because of requirements or because the system cannot maintain a stable pressure for whatever reason. It is possible to have varying pressure so that also the pressure dependency is reflected in each measurement point, such that specific energy consumption, pressure and flow are analyzed together. The three quantities can be plotted in 3d plots or one or more of the quantities can be attributed with a color scale, different symbols or similar.

According to yet another specific embodiment, points of measured specific energy consumption is tied to data of real compressor states, e.g. activity, energy use, and/or flow to associate each measured specific energy consumption measurement point with one of the simulation curve(s) of compressor combinations of the operation model for the multiple compressor system. This embodiment implies to associate each measurement point with the correct (correlating) simulation curve of specific energy consumption by use of e.g. individually measured compressor power and/or individual activity together with total energy usage.

According to one specific embodiment, the ideal specific energy consumption curve(s) for any of the compressor combinations is an ideal specific energy consumption curve based on an operating mode with at least one unloaded compressor. Operating in a mode with one unloaded compressor give a higher specific energy use compared to operate with the same compressor in shut-off, but as it takes much shorter time for a compressor to go from unload to full production flow capacity than from shut-off to full flow capacity it may be a necessary step to be able to cope with fast system flow changes. Operating the system with a compressor in unload although the extra capacity does not need to be on stand-by reduces the system efficiency substantially. The simplest example is for two compressors, wherein either one of the two is in an unloaded mode.

According to yet another specific embodiment, the data of ideal specific energy consumption for one or several common output flow rates for multiple combined compressors, in any combination(s), is individually structured and plotted in ideal specific energy consumption curves, and wherein at least two ideal specific energy consumption curves are aggregated into one common reference curve. This embodiment implies to add several ideal specific energy consumption curves into one "optimal" reference curve. Moreover, this embodiment may also be employed to combine ideal specific energy consumption curves to establish and/or measure control gaps when ideal specific energy consumption curves do not have overlapping regulating flow ranges or based on lack of overlap of the regulating flow range between different ideal specific energy consumption curves. A control gap implies a flow range where the system, and the possible combination of compressors, has no regulating (adjusting) capacity. Depending on the system control strategy and/or compressor control method control gaps may force the system to operate with open blow-down valves and/or cause irregular compressor stop/starts and/or load/unload transitions. This may imply a high specific energy consumption and also a risk of system interference in the form of pressure fluctuations, and therefore it is of interest to avoid such. Such areas may be identified according to the present invention by analyzing if adjustable flow ranges in different compressor combinations are overlapping each other or not (see FIG. 9). This may be performed with or without time dynamical analysis as discussed above. Moreover, also when comparing with real measurement data, this approach may be used to identify if there are existing flows where control gaps may occur as well as the resulting pressure fluctuations.

The method according to the present invention may be employed for both compressors and certain pumps, such as the ones mentioned above. According to one embodiment of the present invention, the multiple compressor system is a compressed gas compressor system and the compressors are compressed gas compressors. To give some possible applications of interest, just as examples, there is natural gas distribution or industrial compressed air (cylinders, pneumatic devices, purging, compressed air for $N_2$ and/or $O_2$ generation etc. etc.). Again, any type of compressor is possible according to the present invention. Compressed air compressor systems are one specific type of great interest in relation to the present invention. Moreover, both open loop and closed loop systems are possible according to the present invention. An open loop system is a system where gas is ejected decompressed into the atmosphere after use. Typical examples are compressed air systems. Closed loop systems are such where the used gas is recirculated into the compressor intake after usage. Typical examples are refrigeration systems and heat pumps.

Furthermore, the present invention is also directed to a computer unit arranged to perform the method according to the present invention, wherein said computer unit is connected to a control unit which monitors and/or controls the multiple compressor system. The computer unit may monitor the system performance and as such also function as an alarm function. Furthermore, it may also be active so that it is in a direct link to the control unit for optimizing the operation performance.

DETAILED DESCRIPTION OF THE DRAWINGS

Below, the drawings are described.

In FIG. 1 is shown a schematic view of a multiple compressor system with common output flow. In this case there are three different compressors in the system. The compressors are regulated individually and the total input power is divided accordingly over the different compressors. A multiple compressor system provides one common output flow regardless if this is directly in one mixing point subsequently to the compressors or if this is e.g. after a common expansion tank.

The compressors may be connected to a ring-line or distribution line and the flow may be split into different end-usage areas in a way that there is no single measurement point where all the combined flow from all compressors passes. The combined end-usage is then the common output flow. The common output flow must then be measured as an aggregated flow from individual measurements throughout the system and/or over the distribution network.

Any compressor system where there at some point in the system is an interconnection between the compressors enabling a cross-flow can be considered as a multi compressor system with a common output flow.

It is also common that the air flow from the compressors may be directed in such a way that there are losses of air from certain compressors from e.g. air dryers that are only connected to part of the compressors. The losses occurred in such a process will then be a part of the total output flow (and/or compensated for in the performance adjustments). Such losses can either be measured or calculated from models and/or other parameters such as pressure. One such example is compressor units sold with an integrated dryer unit which may be connected into a system with compressors with external air dryers and where the air from the two types is mixed after dryers.

Figure 2:
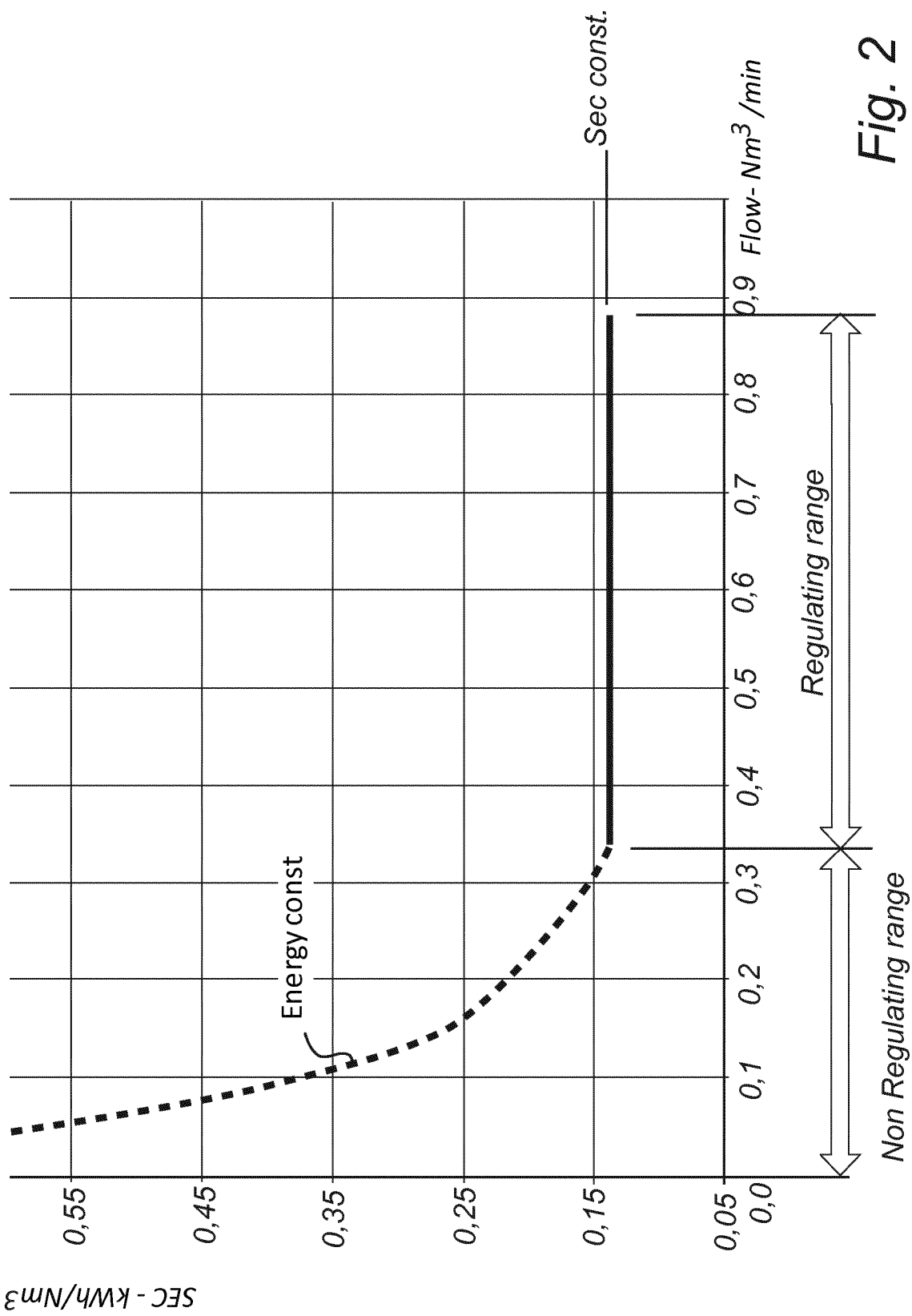

In FIG. 2 is shown a simplified model of the optimally achievable specific energy consumption based on a certain chosen compressor set-up according to the present invention. On the y-axis, specific energy consumption (SEC in the figure) is provided in $kWh/Nm^3$, and on the x-axis, the total common output flow in the system is provided in Nm³/min. In this first simplified model, the power is assumed to be constant in a non-regulating flow range of the chosen compressor set-up, and the specific energy consumption is assumed to be constant in the regulating flow range of the same compressor set-up. In the non-regulating range the excess air produced by the compressor that is not met with system demand is expelled into the free air through a blow-out valve or similar to prevent system pressure from raising causing a constant energy usage irrespectively of the produced output flow. In the regulating range the compressors control system compensate the system demand by regulating the output flow to a desired level. In this context, it may be mentioned that a compressor set-up may be any single compressor when ran stand alone or any combination of compressors. To give an example, when comparing with FIG. 1, this implies a combination of e.g. compressor 1 plus 2 plus 3, compressor 1 plus 3 or compressor 2 plus 3, so any type of combination or all together are possible according to the present invention.

In FIG. 3 is shown further embodiments according to the present invention. In the different cases the profiles in the regulating flow range for a certain compressor set-up are adjusted in accordance as shown in the figures of FIG. 3. The adjustment may be performed with one or more linear compensations, with a mathematically adjusted curve or with a curve based on some decided points (see the last alternative).

With reference to FIG. 3, there are several parameters which is of interest to calculate or know. Firstly, specific energy consumption (SEC) at 100% output flow. Secondly, specific energy consumption at an optimal output flow, i.e. the minimal specific energy consumption, as well as the optimal output flow in percentage. Finally, specific energy consumption when the regulation starts, as well as the output flow, in percentage, when the regulation starts. If more data is available, this is of course beneficial. The upper curve to the left is in the shape of quadratic curve, and may e.g. be any type of n-degree polynomial curve. Also other types are possible, such as Gauss curve, Bézeir curve or other form of parametric curve, cos- or sinus curve. The curve down to the left is two first order curve. In this case, any type of piecewise functions where the function is divided into different flow ranges. Finally, the curve down to the right is also a variant to a piecewise function where an assumption has been made so that the flow ranges are about the same size. This is one possible assumption, but many others are also possible.

Figure 4:
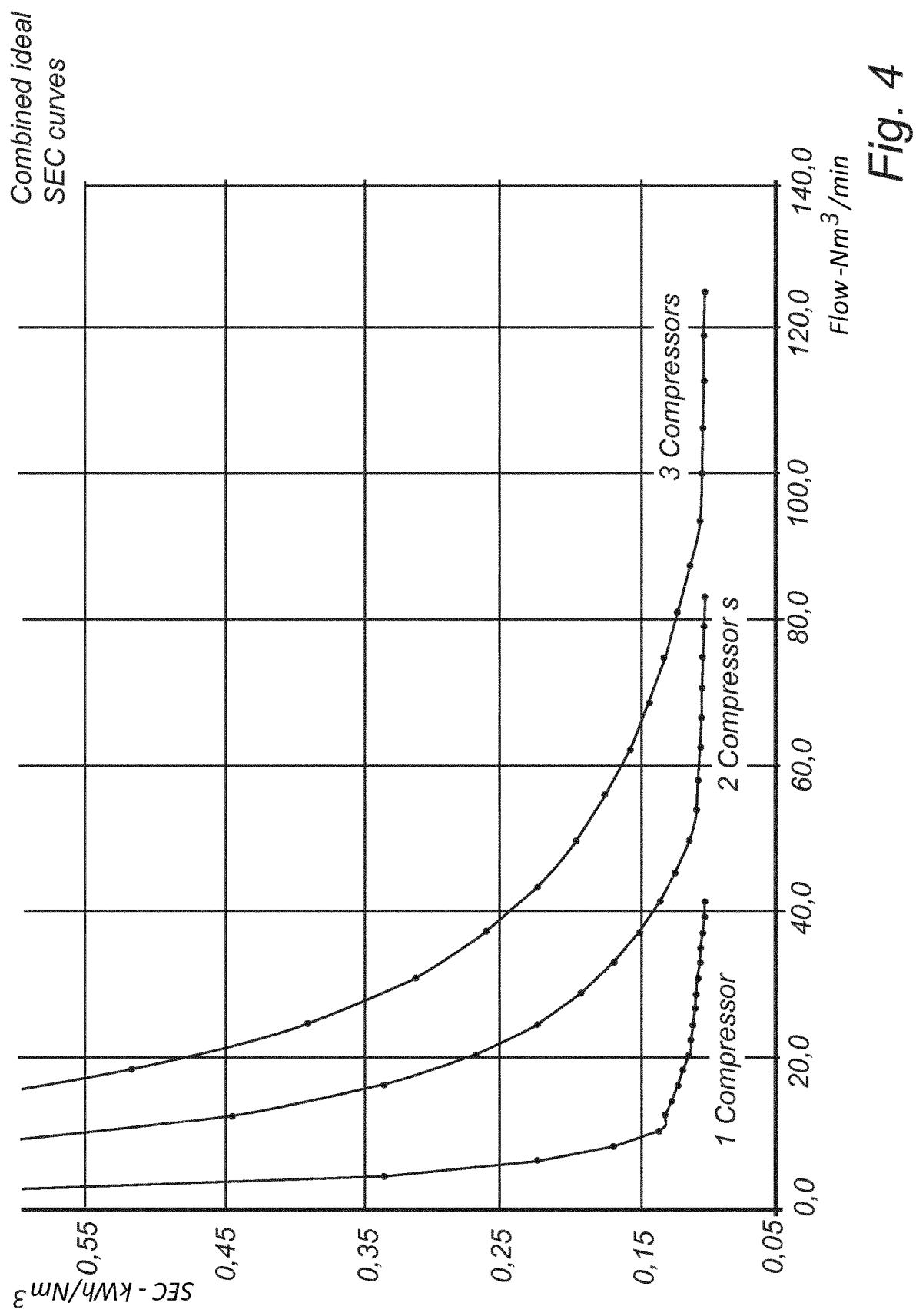

In FIG. 4, there is shown combined ideal specific energy consumption (SEC) curves according to one embodiment of the present invention. As may be noted, the first curve to the left is the ideal specific energy consumption curve of one compressor. This "first" compressor may be any compressor of the multiple compressor system, when being the only compressor in operation. As described above, the ideal specific energy consumption curve of this first compressor is calculated as a function of the output flow of the first compressor, and then plotted as shown in FIG. 4. The next curve is a combined ideal specific energy consumption curve of a first compressor and a second compressor, i.e. any two compressors of the system, as a function of the combined output flow of the first and the second compressor. Accordingly, the last curve shows the combined ideal specific energy consumption of three compressors in sequential operation, i.e. 1, 1 plus 2, 1 plus 2 plus 3. This example is of two non-regulating screw compressors and one frequency regulated screw compressor. The frequency regulating compressor is the first compressor and has a regulating flow range modeled with a 2 section linear adjustment. These different ideal specific energy consumption curves are parts of the theoretical operation model for the multiple compressor system according to the present invention. The lack of overlap in the curves clearly show the existence of regulating gaps in this configuration.

Figure 5:
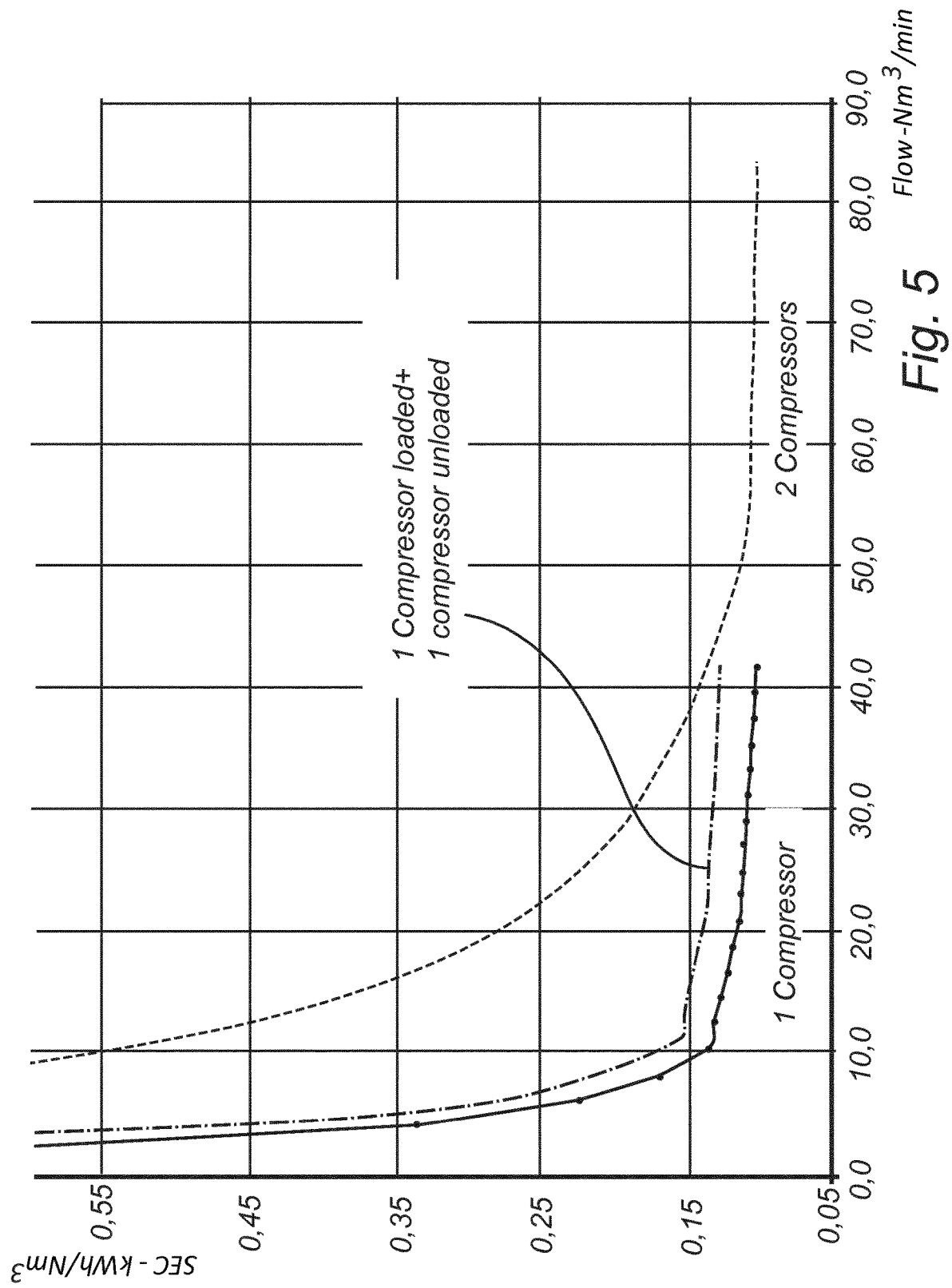

In FIG. 5, there is shown a similar model as shown in FIG. 4, however in this case, not only showing the ideal specific energy consumption (SEC in the figure) curves for one compressor and 2 compressors, but also when one of these compressors is in operation and the other one is in an unloaded mode, i.e. a standby mode (as explained above). The curve including the unloaded compressor has the same output performance as operating on only one compressor but at a 30-40% higher specific energy use.

In FIG. 6, there is shown a similar model as shown in FIGS. 4 and 5, however in this case real measurement data of the specific system has also been plotted into the graph. Therefore, this FIG. 6 shows the real measurement data overlay when compared to ideal specific energy consumption (SEC) curves according to the present invention. The four ideal specific energy consumption curves may depict 1 compressor, 2 compressors, 3 compressors, and 4 compressors. It should be noted that also unloaded combinations may be incorporated into the model. As notable, most real measurement data points are not on a (SEC) curve that would provide the lowest possible specific energy consumption for a certain flow. Furthermore, many measurement points are not directly on or in close proximity to the (SEC) curves but are present at a higher specific energy consumption than if they would have been on the ideal (SEC) curve which further shows improvement opportunities for operating this specific multiple compressor system in a much more efficient way than it is performed today. The figure shows that the system as measured operate at optimal efficiency only in the highest flow range and while operating four compressors.

Figure 7:
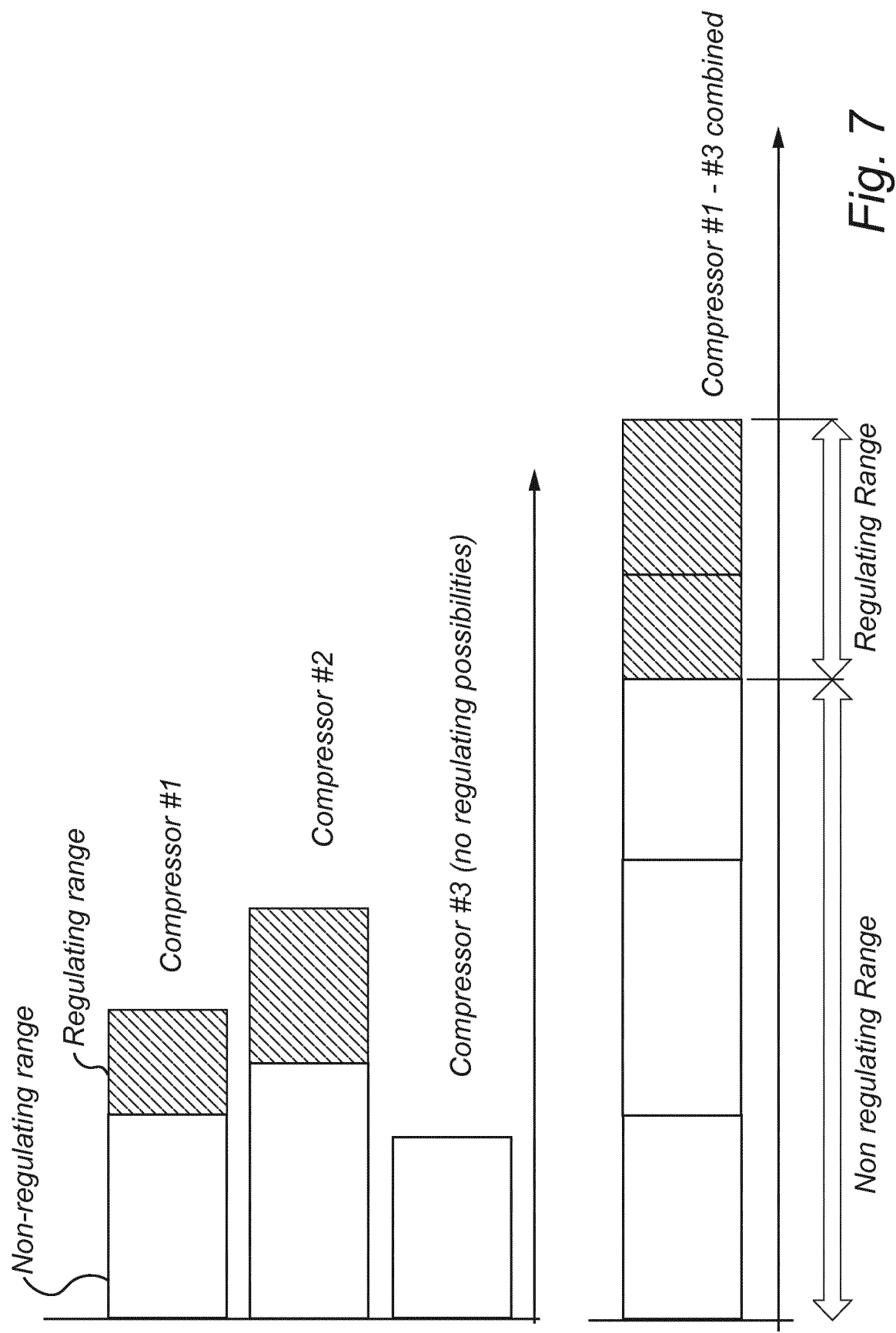

In FIG. 7, there is shown a model according to one specific embodiment of the present invention. The non-regulating flow ranges and regulating flow ranges in relation to flow for the individual compressors are shown firstly. According to one embodiment of the present invention, the theoretical operation model is based on combing non-adjustable flow ranges and adjustable flow ranges for individual compressors separately to form one single virtual compressor. This single virtual compressor is shown below where one may see how the different parts of the individual compressors have been added to form the virtual compressor. As such, this embodiment provides one single virtual compressor with one non-regulating flow range and one regulating flow range in relation to the total flow as a model to use when evaluating a multiple compressor system. The FIG. 7 shows the regulating flow ranges of two compressors being modelled in sequential order so that only one compressor is regulating at a time and the next compressor starts regulating as soon as the previous compressor reaches its regulating flow range limit. The regulating flow ranges of the combined compressor may also be modelled as regulating in parallel over the common regulating flow range or a combination of sequential and parallel. Compressors regulating in parallel would be simultaneously regulating throughout their entire common regulating flow range.

Figure 8:
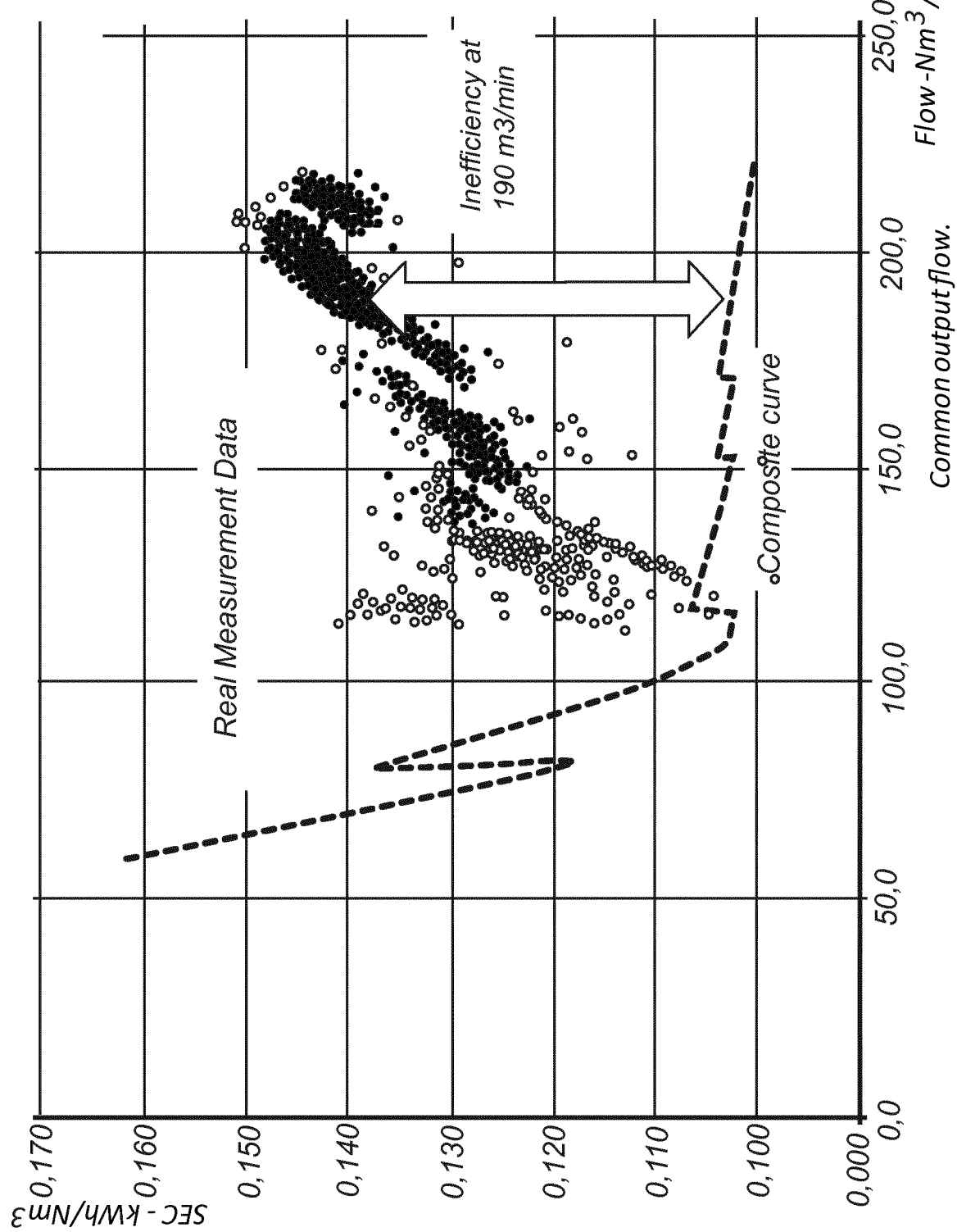

In FIG. 8 is shown one specific embodiment according to the present invention, in which at least two ideal specific energy consumption (SEC) curves are aggregated into one common reference curve (called composite curve in FIG. 8).

Moreover, real measurement data has been plotted into the graph and based on this the inefficiency measured in delta specific energy consumption at a certain system flow may be calculated. The individual efficiency curves may also be adjusted before aggregation based on reduced regulating flow ranges taking system dynamic time constraints into consideration.

Figure 9:
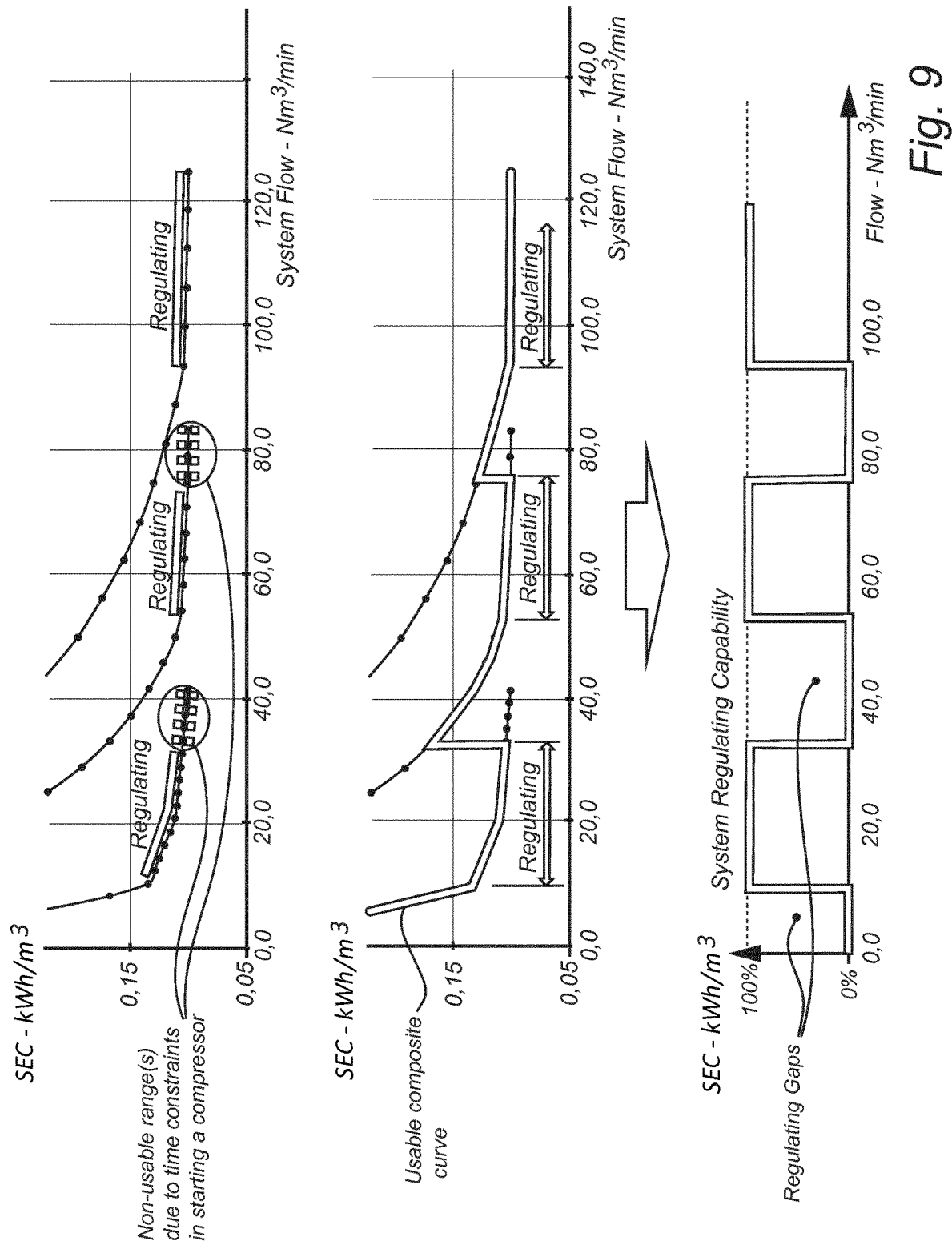

In FIG. 9 is shown three plots of ideal specific energy curves from a three compressor system comprising of one VSD screw compressor and two load/unload type of screw compressors all with similar sizes. The two upper plots show SEC (kWh/Nm$^3$) vs common output flow (Nm$^3$/min) and the bottom plot show the systems regulating capacity for different common output flows.

The uppermost plot shows the available regulating ranges of the different compressor combinations (1, 1 plus 2, 1 plus 2 plus 3) and the non-usable part if the regulating range is marked separately. The non-usable part of the regulating range has been set by taking account of the systems desired capability in handling fast flow changes as well as the needed start-up time for an individual compressor.

The middle plot shows the aggregated ideal specific efficiency curve constructed from the three separate ideal specific energy curves for the three different compressor combinations. The non-usable part of each curves regulating range has been excluded while performing the aggregation. The bottom plot shows a visualization of where the regulating gaps for the system is present based on the aggregated curve shown in the middle plot. 100% on the y-axis show that the system has full regulating capability and thus can operate efficiently and stable. 0% on the y-axis show that the system lack regulating capability for those flow ranges and thereby indicates the position of the systems regulating gaps.

Figure 10:
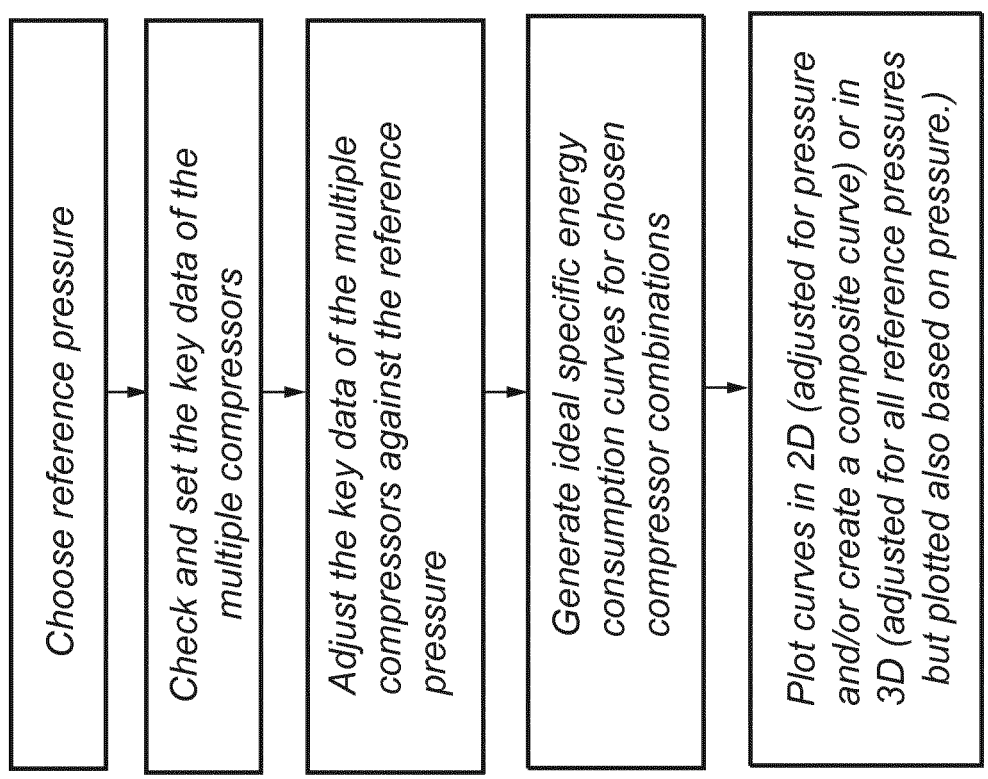

In FIG. 10 is shown a schematic view of a method and the steps therein according to one embodiment of the present invention.

Figure 11:
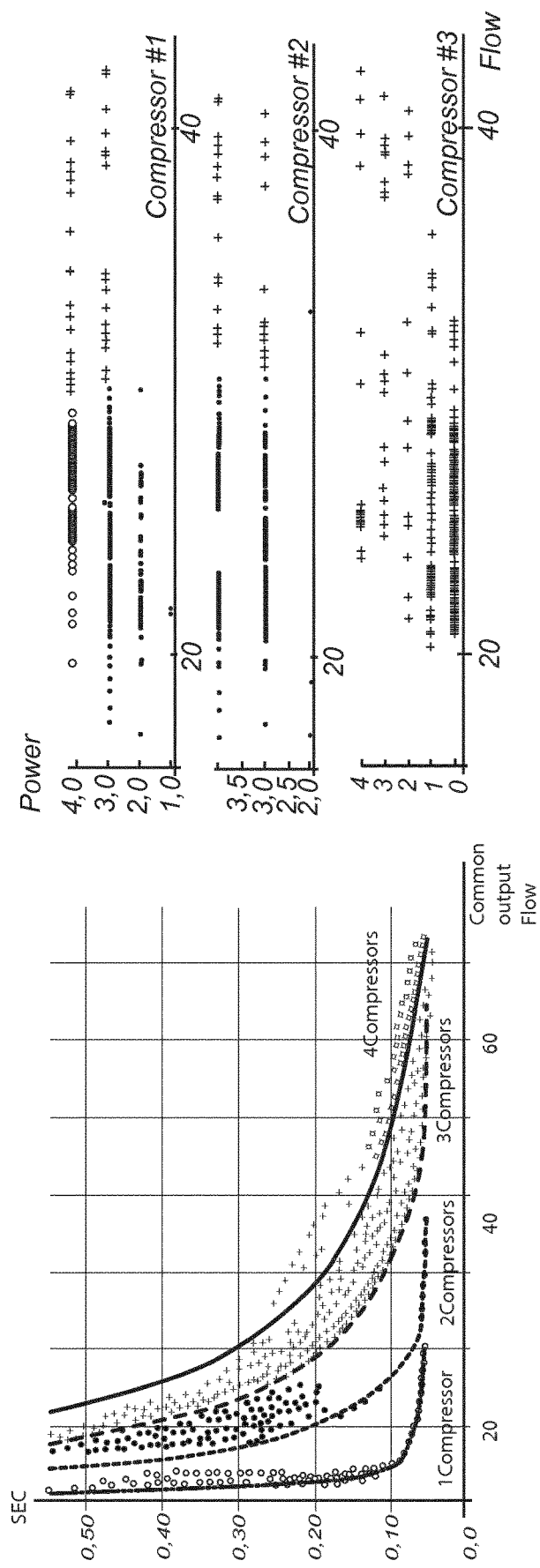

In FIG. 11 is shown two separate linked plots for a four compressor system according to one embodiment of the invention where the individual measurement points for each detected compressor combination is identified with a unique symbol. The upper plot shows measured SEC vs. common output flow, the lower left plot shows system pressure vs. common output flow and the lower right triplet plots show individual compressors energy usage vs. the common output flow for three of the system's compressors.

Moreover, it should be noted that Specific Energy Consumption (SEC) may be calculated on dry or wet air. It should be noted that both alternatives are possible according to the present invention. Moreover, both of them may be combined. For instance, SEC for the compressors may be calculated on wet air and the system SEC may be calculated on dry air to evaluate if a compressor or a dryer is the most inefficient component in the system.

CONCLUSION

The present invention provides a model for simulating an existing multiple compressor system to find the optimal operation mode, a simulation when designing a new system or a simulation of an existing system for evaluating the same in comparison with real measurement data.

The method according to the present invention may be directed to different types of usage. For instance, the method may be directed to regulation of a multiple compressor system as such. Moreover, the operation model according to the present invention may also be used only as a simulation model or mathematical model for analyzing an existing multiple compressor system. By use of the model as such, a multiple compressor system may be evaluated and improvements may be implemented. Furthermore, this also implies that the operation model according to the present invention may be used as a type of virtual multiple compressor. Regardless, the main direction of the present invention is a modelling method, implemented directly into a multiple compressor system or used indirectly off-site only on collected data.

The present method is aimed at constructing or calculating ideal specific energy consumption curves for different compressor combinations in the multiple compressor system. This is different when comparing to other existing systems today. Moreover, another clear difference is the fact that the present invention takes both non-adjustable and adjustable flow ranges into account in the model. Other known methods, which are directed to setting a suitable dimension of new systems, and as such directed to measuring only totally adjustable flow ranges. This also implies that such methods are not suitable for comparing to real data measurements, which is enabled by the present inventions. Furthermore, such methods are not directed to calculation or measurement of specific energy consumption, which is a key feature according to the present invention as it gauges the energy efficiency.

Moreover, today known sizing methods intended for setting a suitable dimension of a new system are binary, i.e. directed to "right" or "wrong" size, and they have proven to give operation modes which are considerably outside the ideal design area in many cases, even if the sizing method in itself gives what seems to be a correct system dimension. Also in this context, the method according to the present invention is a great improvement over the existing methods.

The method according to the present invention also has a unique advantage in that the model is adjusted for one or more reference pressures before constructing specific energy curves for multiple compressors making the analysis decoupled from both system pressure changes as well as design pressures, simplifying analysis, simulation, calculations and visualizations. As the method according to the present invention incorporates means for adjusting the reference pressure for either the specific energy consumption (SEC) curves once calculated or for real measurement data towards a reference pressure it is capable of both analyzing and simulating the effect of system pressure changes.

To summarize, the method according to the present invention has several advantages in comparison to these sizing methods and other known methods. Firstly, as the method involves a model of energy consumption for each compressor, taking into account adjustable and non-adjustable flow ranges, it can estimate energy consumption with improved precisions and over a wider flow range compared to previous methods. Secondly, real data may be compared directly to the simulation model provided in accordance with the present invention. Moreover, the present invention provides the starting point for simplifying several types of analysis of an existing multiple compressor system and also if designing (sizing) a new system. The present method enables to provide pressure independent operation models of several compressor combinations, which is comparable to the reality for most systems. Moreover, also control gaps and system interferences are possible to detect and evaluate by use of the method according to the present invention. As such, also parameters set incorrectly may also be detected. This is a typical problem when using the known sizing methods mentioned above, i.e. that the parameters are assumed to be correctly set per se, which is often not the case.

To mention other advantages discussed above, the possibility of pressure adjustment in the present model, and to work with a reference pressure for the entire system, are also beneficial. This is an advantage as the method according to the present invention takes variations in the system pressure into account when comparing with real measured data and also considers compressors designed for different pressures as well as different system operating pressures. Moreover, the method also opens up for simple tests of the effect of different pressures or changes in pressure in a multiple compressor system.

To give a guidance of the possible level of improvement when using the present invention, a possible value of specific energy consumption as kWh/Nm³ at around 0.09 or 0.1 in the widely used pressure band of 6-8 bar may be obtainable using large size screw or turbo compressors, which may be compared to a level of anywhere from 0.15 and upwards which is a common level for a reference multiple compressor system running without proper optimization and/or regulating capability. To lower the specific energy consumption value of this magnitude is of course of great interest.

The invention claimed is:

1. A method for gauging energy used for producing a unit of mass or volume of compressed gas (Specific Energy Consumption) in relation to a common output flow in a multiple compressor system, said method comprising:
   from a first compressor, constructing an ideal specific energy consumption curve in the first compressor as a function of the output flow of the first compressor; and
   from the first compressor and a second compressor, constructing a combined ideal specific energy consumption curve in the first compressor and the second compressor as a function of the combined output flow of the first compressor and the second compressor;
   constructing one or several ideal specific energy consumption curve(s) for multiple combined compressors, in any combination(s), wherein ideal specific energy consumption curve(s) show the lowest attainable specific energy consumption at a certain pressure level;
   creating an operation model for the multiple compressor system, the operation model including at least one ideal specific energy consumption curve(s) for multiple combined compressors, in any combination(s); and
   adapting the multiple compressor system based on the operation model.

2. The method according to claim 1, wherein the method involves constructing the ideal specific energy consumption curve(s) for one or more fixed system reference pressure(s).

3. The method according to claim 1, wherein the method involves constructing one or several ideal specific energy consumption curves(s) for multiple combined compressors, in any combination(s), and wherein at least one combination is based on combining adjustable flow ranges of individual compressors.

4. The method according to claim 1, wherein the operation model is based on combing non-adjustable flow ranges and adjustable flow ranges for individual compressors separately to form one single virtual compressor.

5. The method according to claim 1, wherein the ideal specific energy consumption curve(s) is calculated with specific energy consumption set as a constant within the compressor(s) regulating flow range and where ideal specific energy consumption is calculated from a constant power use for the compressor(s) non- regulating flow range.

6. The method according to claim 1, wherein the ideal specific energy consumption curve(s) is adjusted for changes in efficiency within the regulating flow range.

7. The method according to claim 1, wherein the ideal specific energy consumption curve(s) is calculated employing design or performance curves of the individual compressors.

8. The method according to claim 1, wherein the data of ideal specific energy consumption vs common output flow is structured and plotted using the same reference pressure or where the plotting is executed with one additional dimension featuring a variable reference pressure.

9. The method according to claim 1, wherein the method and thus operation model involves compensation of the usable flow range for each compressor combination and operating mode based on the time dependency of each of the compressors when going from off mode to on mode, from unload(standby) to load (on mode) and/or the rate of change in flow rates measured in the multiple compressor system.

10. The method according to claim 1, wherein measured specific energy consumption from the multiple compressor system is compared with the data of the calculated ideal specific energy consumption curve(s) for the same multiple compressor system.

11. The method according to claim 1, wherein points of measured specific energy consumption is tied to data of real compressor energy use and/or flow to associate each measured specific energy consumption measurement point with one of the simulation curve(s) of compressor combinations of the operation model for the multiple compressor system.

12. The method according to claim 1, wherein the ideal specific energy consumption curve(s) for any of the compressor combinations is an ideal specific energy consumption curve based on an operating mode with at least one unloaded compressor.

13. The method according to claim 1, wherein the data of ideal specific energy consumption curve(s) for one or several common output flow rates for multiple combined compressors, in any combination(s), is individually structured and plotted in ideal specific energy consumption curves, and wherein at least two ideal specific energy consumption curves are aggregated into one common reference curve.

14. The method according to claim 1, wherein the data of ideal specific energy consumption for one or several common output flow rates for multiple combined compressors, in any combination(s), is combined individually structured and plotted in ideal specific energy consumption curves, and wherein the method involves combining ideal specific energy consumption curves to establish and/or measure control gaps based on lack of overlap of the regulating flow range between different ideal specific energy consumption curves.

15. The method according to claim 1, wherein the multiple compressor system is a compressed gas compressor system and the compressors are compressed gas compressors.

16. The method according to claim 1, wherein the multiple compressor system is a compressed air compressor system and the compressors are compressed air compressors.

17. Computer unit arranged to perform the method according to claim 1, wherein said computer unit is connected to a control unit which monitors and/or controls the multiple compressor system.

18. A method for gauging energy used for producing a unit of mass or volume of compressed gas (Specific Energy Consumption) in relation to a common output flow in a multiple compressor system, said method comprising:

from a first compressor, constructing an ideal specific energy consumption curve in the first compressor as a function of the output flow of the first compressor; and from the first compressor and a second compressor, constructing a combined ideal specific energy consumption curve in the first compressor and the second compressor as a function of the combined output flow of the first compressor and the second compressor;

constructing one or several ideal specific energy consumption curve(s) for multiple combined compressors, in any combination(s), wherein the ideal specific energy consumption curve(s) for any of the compressor combinations is an ideal specific energy consumption curve based on an operating mode with at least one unloaded compressor;

creating an operation model for the multiple compressor system; and adapting the multiple compressor system based on the operation model.

* * * * *